(12) United States Patent
Yang et al.

(10) Patent No.: US 8,523,370 B2
(45) Date of Patent: Sep. 3, 2013

(54) ELECTRONIC APPARATUS

(75) Inventors: Cho-Chuan Yang, Taipei Hsien (TW);
Chun-Hsi Lin, Taipei Hsien (TW);
Hung-Chang Chen, Taipei Hsien (TW);
Ming-Chang Kuo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 190 days.

(21) Appl. No.: 12/880,153

(22) Filed: Sep. 13, 2010

(65) Prior Publication Data

US 2011/0063528 A1    Mar. 17, 2011

(30) Foreign Application Priority Data

Sep. 14, 2009    (CN) .......................... 2009 1 0306970

(51) Int. Cl.
*G03B 21/28*    (2006.01)

(52) U.S. Cl.
USPC .................................... 353/119; 361/679.23

(58) Field of Classification Search
USPC .............. 353/119; 248/674, 122.1; 359/453; 361/679.23
See application file for complete search history.

(56) References Cited

U.S. PATENT DOCUMENTS

| | | | |
|---|---|---|---|
| 7,800,648 B2 * | 9/2010 | Lu et al. ..................... | 348/207.1 |
| 2005/0257230 A1 | 11/2005 | Wu et al. | |
| 2006/0234784 A1 * | 10/2006 | Reinhorn ................... | 455/575.1 |

FOREIGN PATENT DOCUMENTS

| CN | 201293953 | * | 8/2009 |
|---|---|---|---|
| CN | 201293953 Y | | 8/2009 |
| TW | M348251 | | 1/2009 |

OTHER PUBLICATIONS

Derwent Information LDT for CN 201293953. Aug. 19, 2009.*

* cited by examiner

*Primary Examiner* — Georgia Y Epps
*Assistant Examiner* — Jerry Brooks
(74) *Attorney, Agent, or Firm* — Altis Law Group, Inc.

(57) ABSTRACT

An electronic apparatus includes a main body and a projection mechanism. The main body is used for providing video signals. The projection mechanism includes a built-in mini-projector that can either be stored in the electronic apparatus or extended out of the electronic apparatus for use. The mini-projector is capable of receiving video signals and projecting corresponding images when the projection mechanism is extended, and stops the projection of images when retracted.

7 Claims, 5 Drawing Sheets

ELECTRONIC APPARATUS

BACKGROUND

1. Technical Field

The disclosed embodiments relate to electronic apparatuses, and particularly to an electronic apparatus with a mini-projector.

2. Description of Related Art

A conventional projector commonly has complicated structure that lead to large volume with higher power consumption, thus it is hard for users to carry the projector with them, and the projector is often set in a meeting room. While performing a presentation in the meeting room, the users have to use the electronic device in combination with the projector set in the meeting room. It takes time to set up connections between the electronic device and the projector. This results in great inconvenience of the users.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout five views.

DETAILED DESCRIPTION

Figure 1:
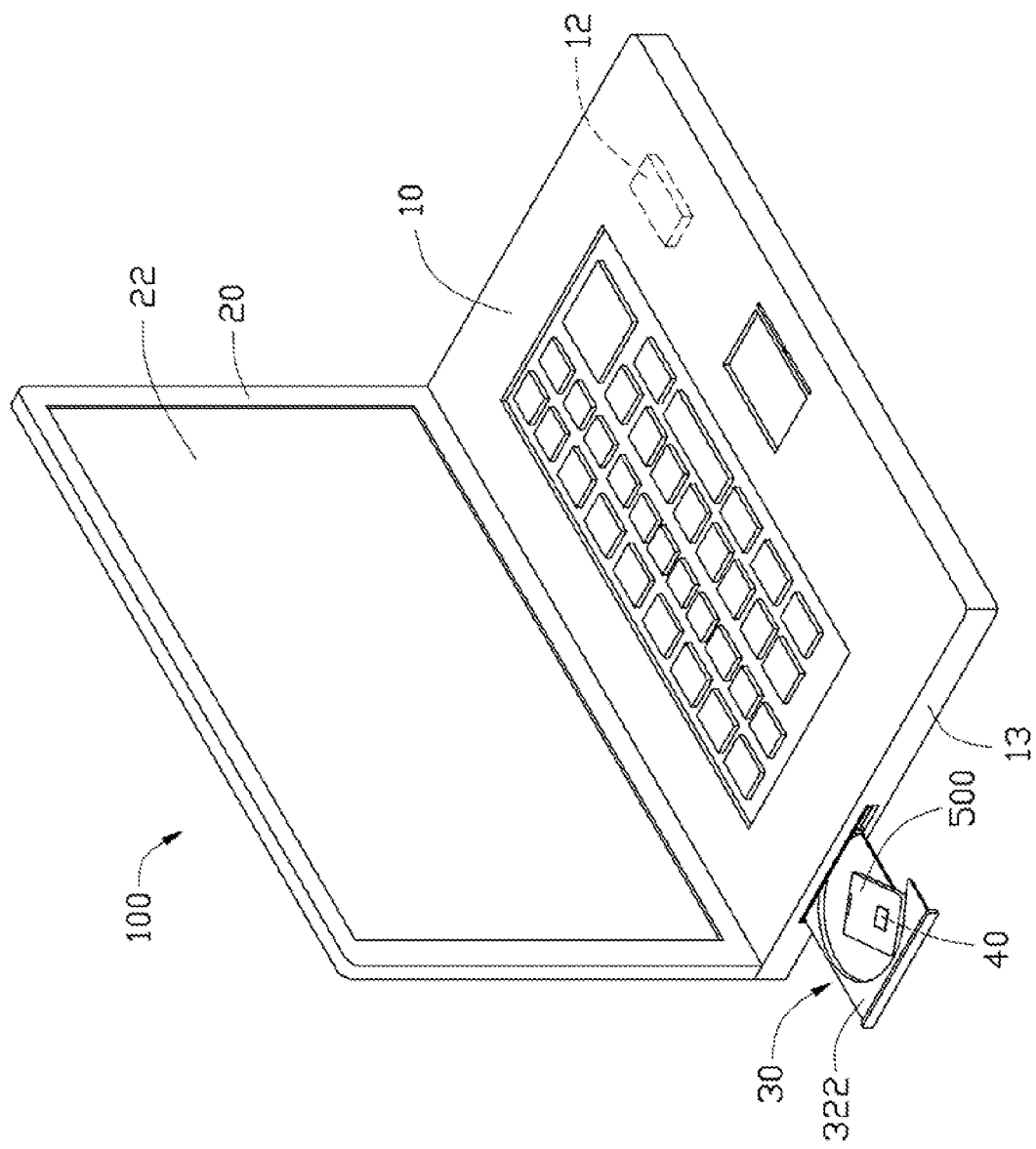
FIG. 1 is a perspective view showing an electronic apparatus in accordance with an exemplary embodiment in one state.

Referring to FIG. 1, an electronic apparatus 100 includes a main body 10, a cover 20, and a projection mechanism 30. The electronic apparatus 100 may be a notebook computer or a portable digital versatile disc (DVD) player. In this embodiment, the electronic apparatus 100 is a notebook computer.

The main body 10 includes a processor 12 for providing video signals.

The cover 20 is pivotably connected to the main body 10. The cover 20 includes a display panel 22 for displaying images.

The projection mechanism 30 includes a mini-projector 40. The projection mechanism 30 is movable between a retracted position at which the projection mechanism 30 is entirely disposed within the main body 10, and an extended position at which the projection mechanism 30 extends out of the main body 10. When the projection mechanism 30 is in the extended position, the mini-projector 40 can receive video signals from the processor 12 and project corresponding images. When the projection mechanism 30 is in the retracted position, the mini-projector 40 cannot project images. In this embodiment, the mini-projector 40 is a light emitting diode (LED) projector.

Figure 2:
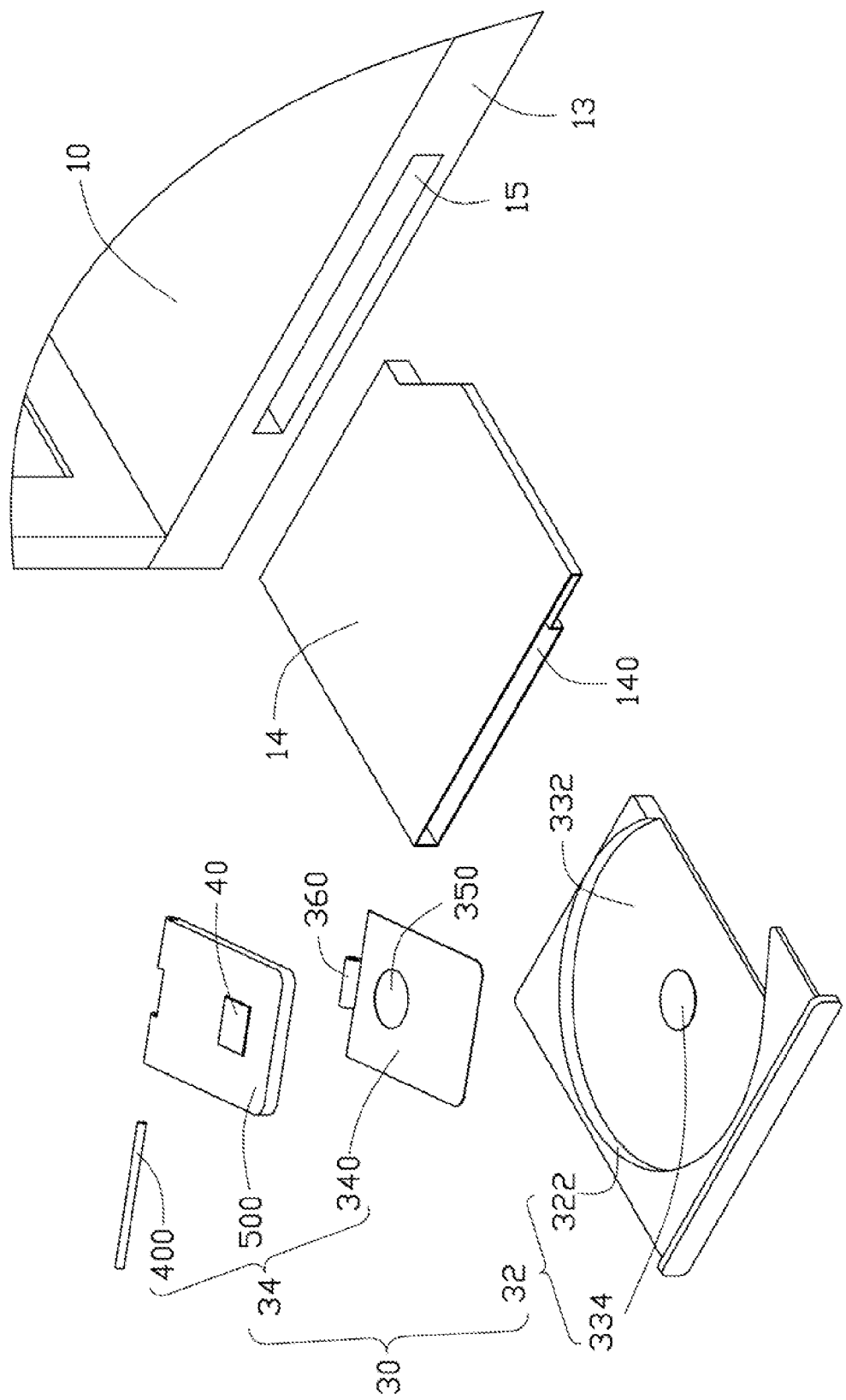
FIG. 2 is a partially exploded view showing the electronic apparatus of FIG. 1, the electronic apparatus includes a rotation module.
Figure 3:
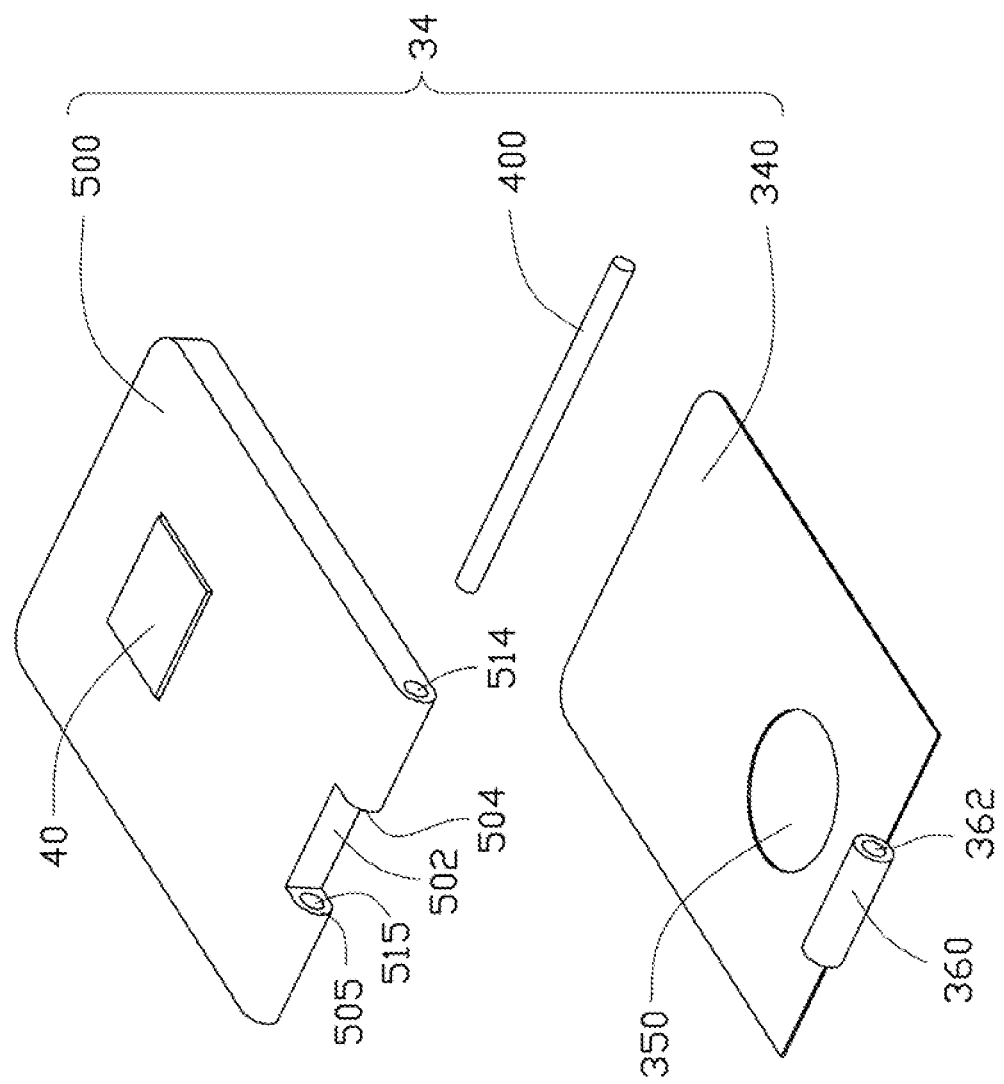
FIG. 3 is an exploded view showing the rotation module of FIG. 2, but viewed from another angle.
Figure 4:
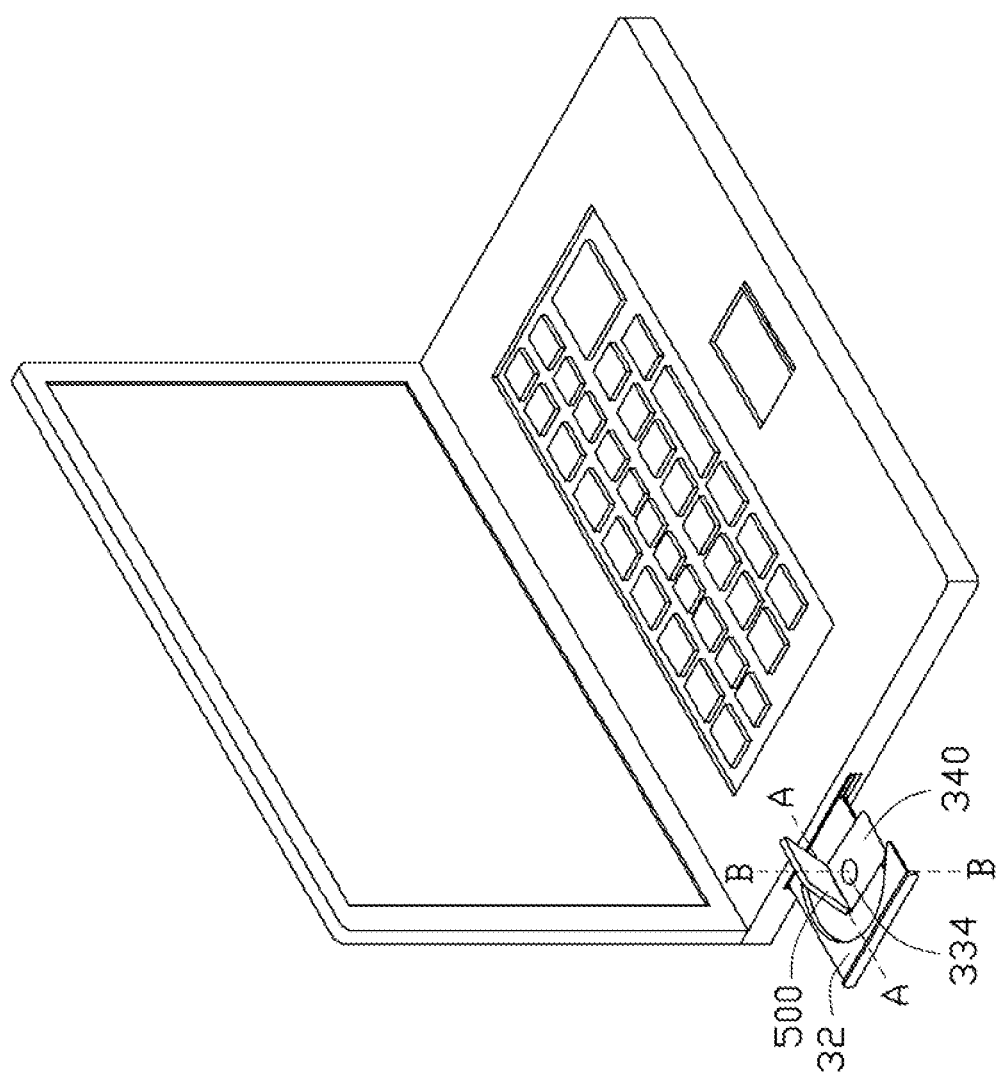
FIG. 4 is a perspective view showing the electronic apparatus of FIG. 1 in another state.

Referring to FIGS. 2, 3, and 4, the main body 10 defines a chamber 15, and a casing 14 is received and fixed in the chamber 15. The casing 14 defines a first opening 140. The projection mechanism 30 is disposed in the casing 14 through the first opening 140.

The projection mechanism 30 further includes a rotation module 34 and a tray 32 for supporting the rotation module 34. The mini-projector 40 is disposed on the rotation module 34, the rotation module 34 is rotatably fixed to the tray 32, and the mini-projector 40 is rotatable relative to the tray 32 in first and second directions. In this embodiment, the first direction is a horizontal direction, and the second direction is a vertical direction.

The rotation module 34 includes a shaft 400 pivotably connecting a connecting part 340 to a main part 500. The mini-projector 40 is disposed on the main part 500. The connecting part 340 is rotatably fixed to the tray 32. An engaging portion 360 is formed on one side of the connecting part 340. The engaging portion 360 defines a first through hole 362. The main part 500 defines a receiving portion 502 for receiving the engaging portion 360 and includes a first protrusion portion 504 and a second protrusion portion 505. The receiving portion 502 is formed between the first protrusion portion 504 and the second protrusion portion 505. The first protrusion portion 504 defines a second through hole 514, and the second protrusion portion 505 defines a third through hole 515. The shaft 400 successively passes through the second through hole 514, the first through hole 362, and the third through hole 515 to pivotably connect the connecting part 340 to the main part 500. The connecting part 340 is rotatable relative to the tray 32 around an axis B-B perpendicular to the tray 32, and the main part 500 is rotatable relative to the connecting part 340 around an axis A-A parallel to the tray 32 (see FIG. 4).

The tray 32 defines a receiving space 322 for receiving the rotation module 34 and includes a bottom surface 332, and a fixing part 334 protrudes from the bottom surface 332. The connecting part 340 defines a second opening 350, and is rotatably fixed to the fixing part 334 through the second opening 350.

Figure 5:
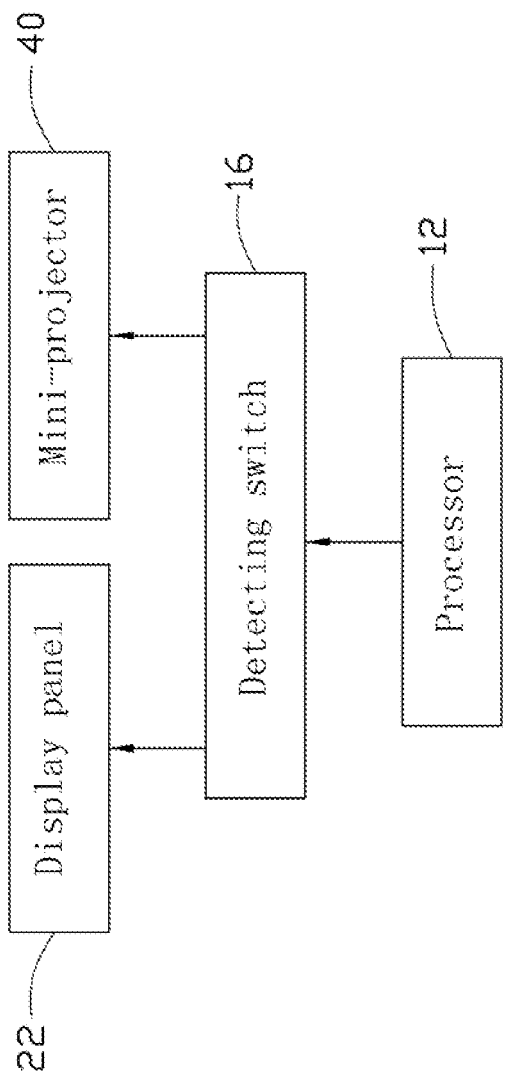
FIG. 5 is a block diagram showing the electronic apparatus of FIG. 1.

Referring to FIG. 5, the main body 10 further includes a switch 16 electrically connected between the processor 12 and the mini-projector 40. The switch 16 establishes an electrical connection between the processor 12 and the mini-projector 40 when the projection mechanism 30 is in the extended position, so that the mini-projector 40 can receive video signals from the processor 12 and project corresponding images. The switch 16 cuts off the electrical connection between the processor 12 and the mini-projector 40 when the projection mechanism 30 is in the retracted position, and the mini-projector 40 cannot project images.

The switch 16 is also electrically connected between the processor 12 and the display panel 22. The switch 16 establishes an electrical connection between the processor 12 and the display panel 22 when the projection mechanism 30 is in the retracted position, so that the display panel 22 can receive video signals from the processor 12 and display corresponding images. The switch 16 cuts off the electrical connection between the processor 12 and the display panel 22 when the projection mechanism 30 is in the extended position, and the display panel 22 cannot display images.

It is convenient to use the electronic apparatus 100 with extendable built-in mini-projector 40.

Further alternative embodiments will become apparent to those skilled in the art without departing from the spirit and scope of what is claimed. Accordingly, the present invention should be deemed not to be limited to the above detailed description, but rather only by the claims that follow and equivalents thereof.

What is claimed is:

1. An electronic apparatus comprising:
a main body for providing video signals; and
a projection mechanism comprising a mini-projector and being movable between a retracted position at which the projection mechanism is disposed in the main body and an extended position at which the projection mechanism extends out of the main body;
wherein the mini-projector receives video signals and projects corresponding images when the projection mechanism is in the extended position, and cannot project images when the projection mechanism is in the retracted position;
wherein the projection mechanism further comprises a tray slidably connected to the main body and a rotation module disposed on the tray, the mini-projector is mounted to the rotation module, the rotation module comprises a connecting part connected to the tray, the connecting part is rotatable relative to the tray around an axis perpendicular to the tray;
wherein the rotation module further comprises a main part pivotably connected to the connecting part, and the main part is rotatable relative to the connecting part around an axis parallel to the tray, the mini-projector is mounted to the main part; the rotation module comprises a shaft pivotably connecting the connecting part to the main part; an engaging portion is formed on one side of the connecting part, the engaging portion defines a first through hole, the main part defines a receiving portion for receiving the engaging portion and includes a first protrusion portion and a second protrusion portion, the receiving portion is formed between the first protrusion portion and the second protrusion portion, the first protrusion portion defines a second through hole, and the second protrusion portion defines a third through hole, the shaft successively passes through the second through hole, the first through hole, and the third through hole to pivotably connect the connecting part to the main part.

2. The electronic apparatus of claim 1, wherein the mini-projector is rotatable relative to the tray in a first direction and a second direction different from the first direction.

3. The electronic apparatus of claim 2, wherein the first direction is a horizontal direction, the second direction is a vertical direction.

4. The electronic apparatus of claim 1, further comprising a cover pivotably connected to the main body, wherein the cover comprises a display panel electrically connected to the main body, the display panel receives video signals and displays corresponding images when the projection mechanism is in the retracted position, and cannot display images when the projection mechanism is in the extended position.

5. The electronic apparatus of claim 1, wherein the main body comprises a processor for providing video signals and a switch, the switch establishes an electrical connection between the processor and the mini-projector when the projection mechanism is in the extended position, and cuts off the electrical connection between the processor and the mini-projector when the projection mechanism is in the retracted position.

6. The electronic apparatus of claim 4, wherein the main body comprises a processor for providing video signals and a switch, the switch establishes an electrical connection between the processor and the display panel when the projection mechanism is in the refracted position, and cuts off the electrical connection between the processor and the display panel when the projection mechanism is in the extended position.

7. The electronic apparatus of claim 1, wherein the tray defines a receiving space for receiving the rotation module, the tray includes a bottom surface and a fixing part protruding from the bottom surface; the connecting part defines a first opening and is rotatably fixed to the fixing part through the first opening.

* * * * *